United States Patent Office 3,432,041
Patented Mar. 11, 1969

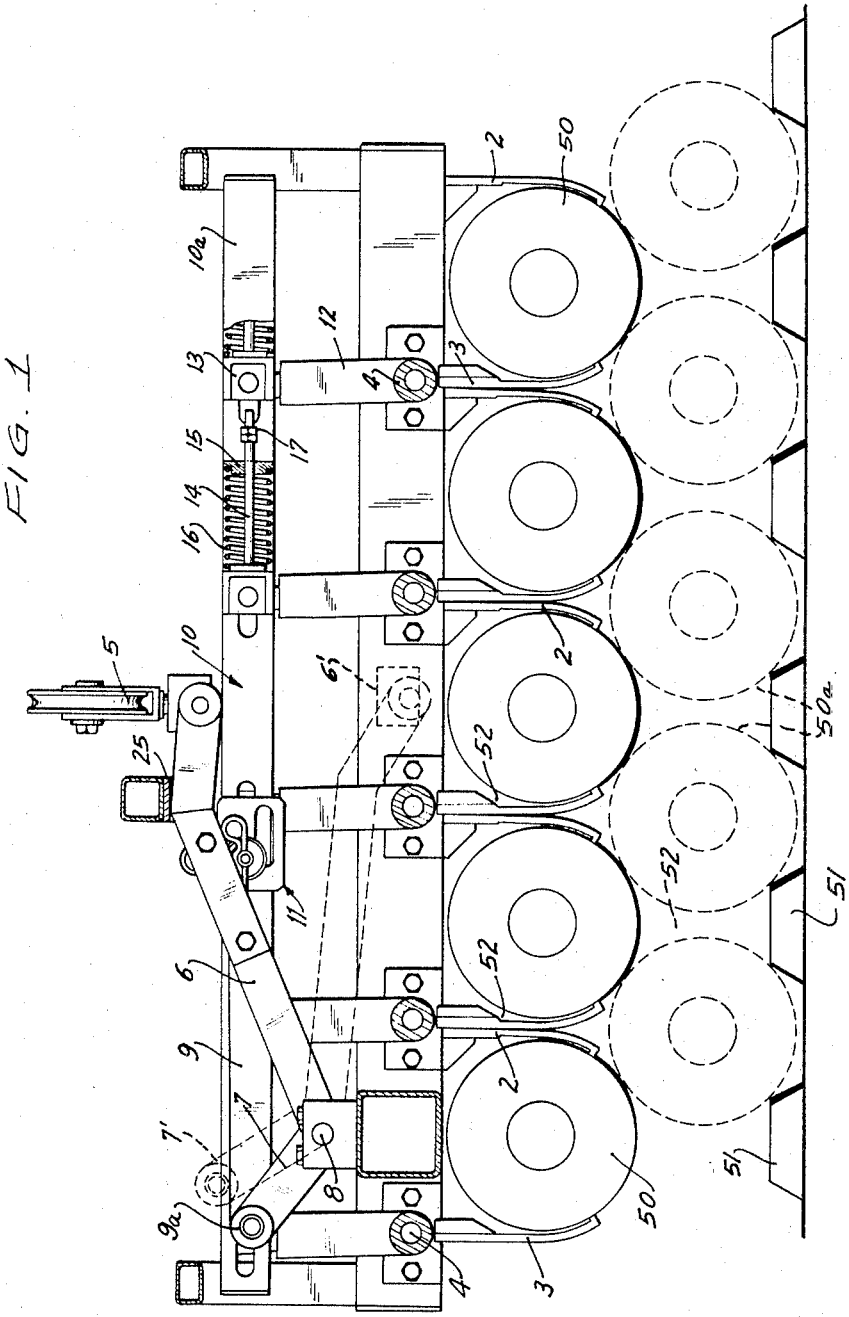

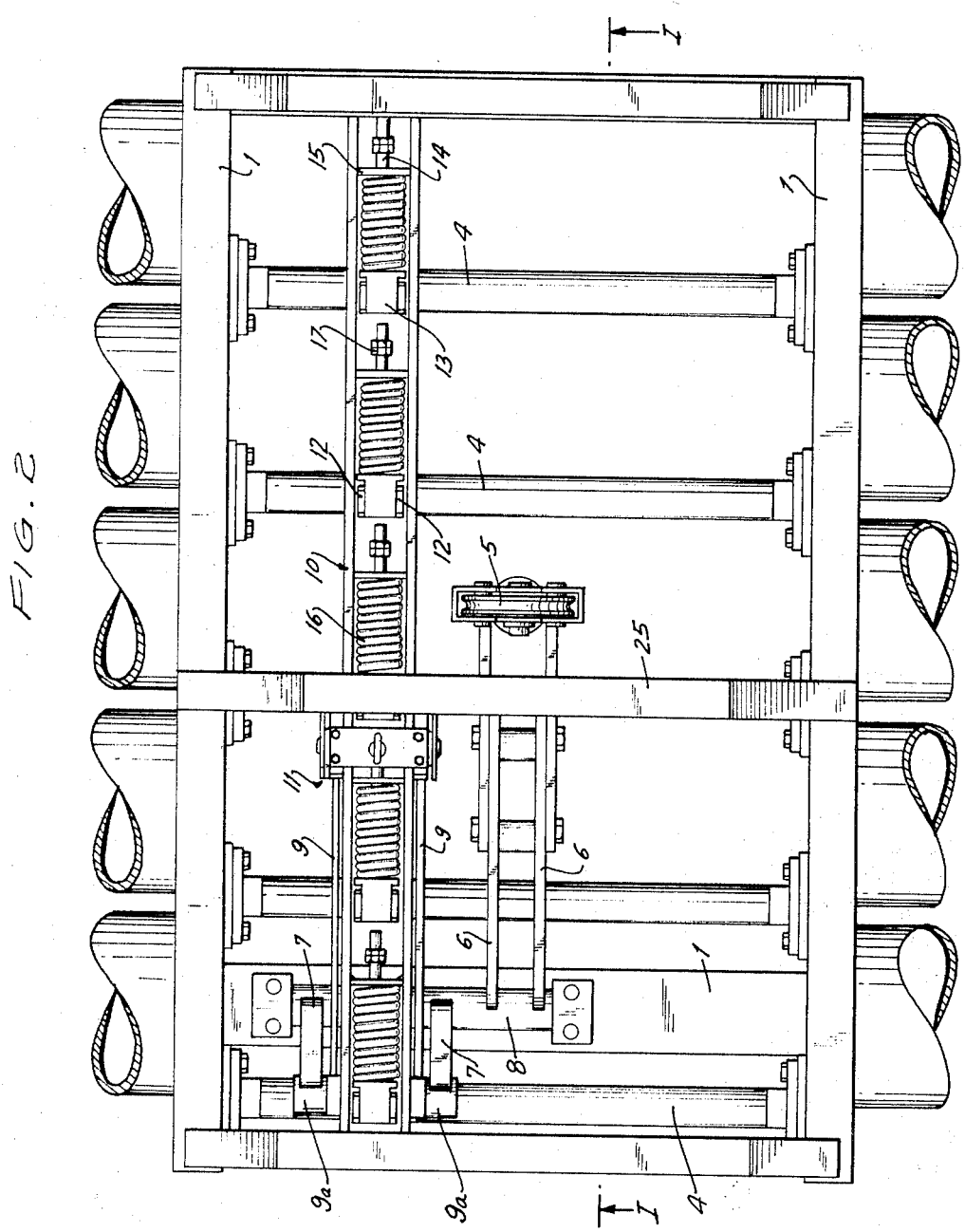

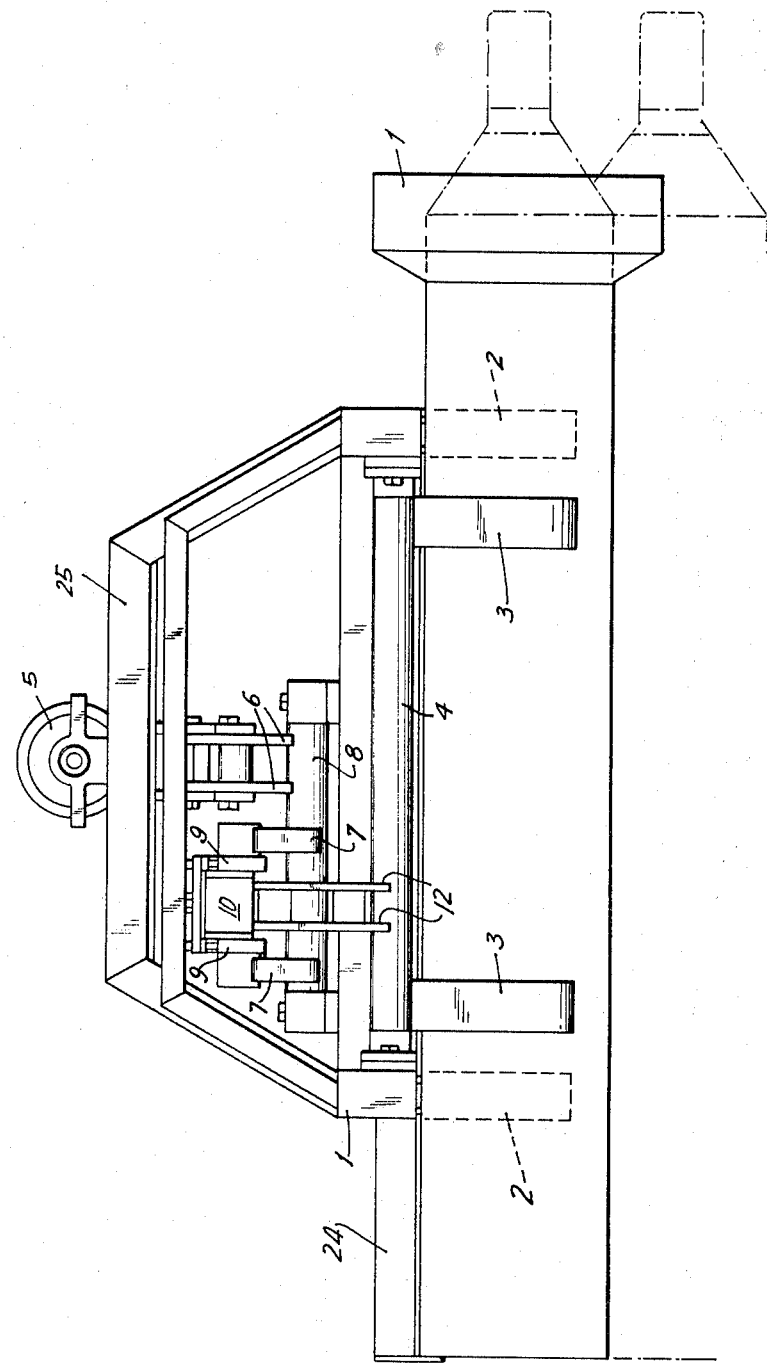

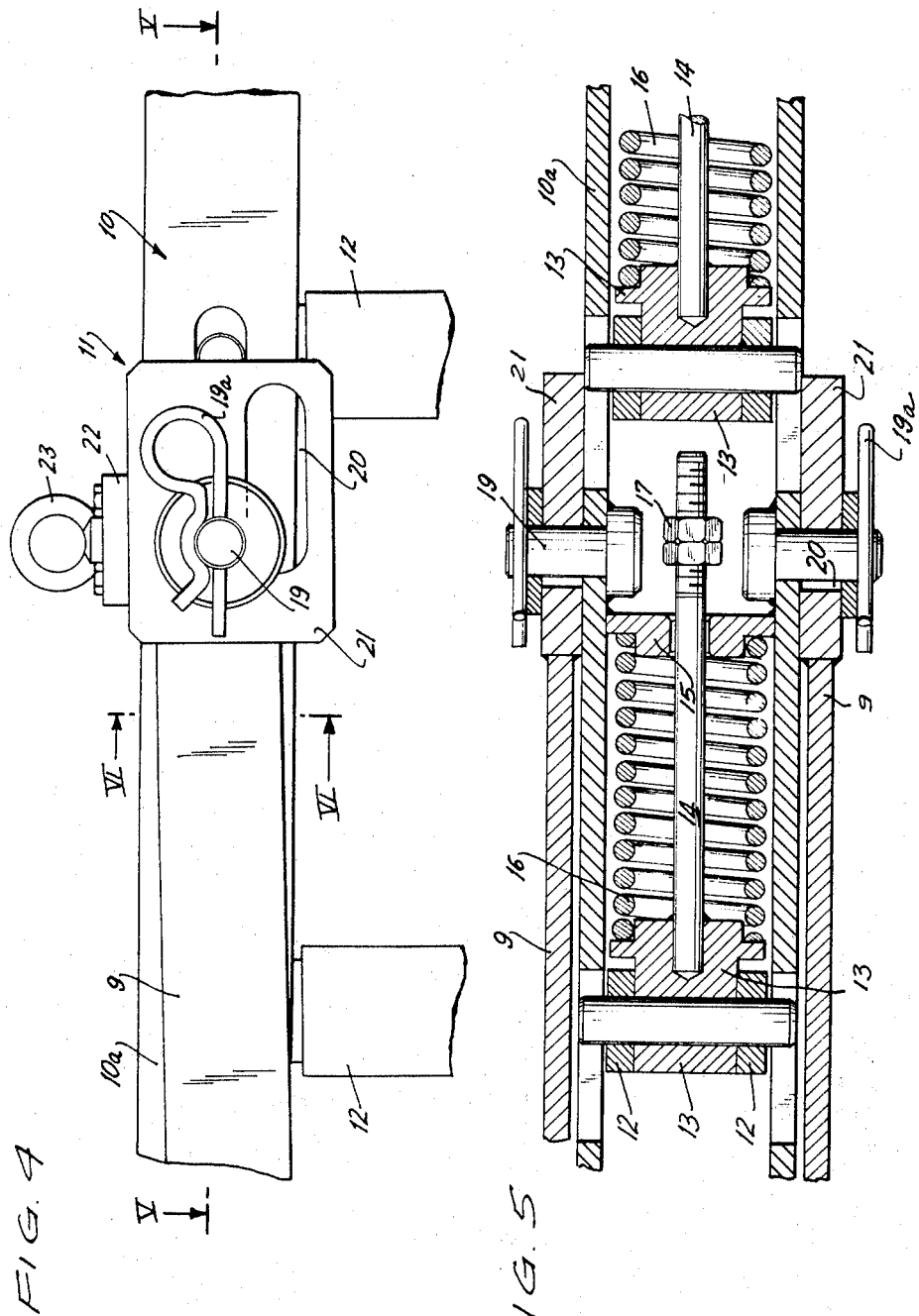

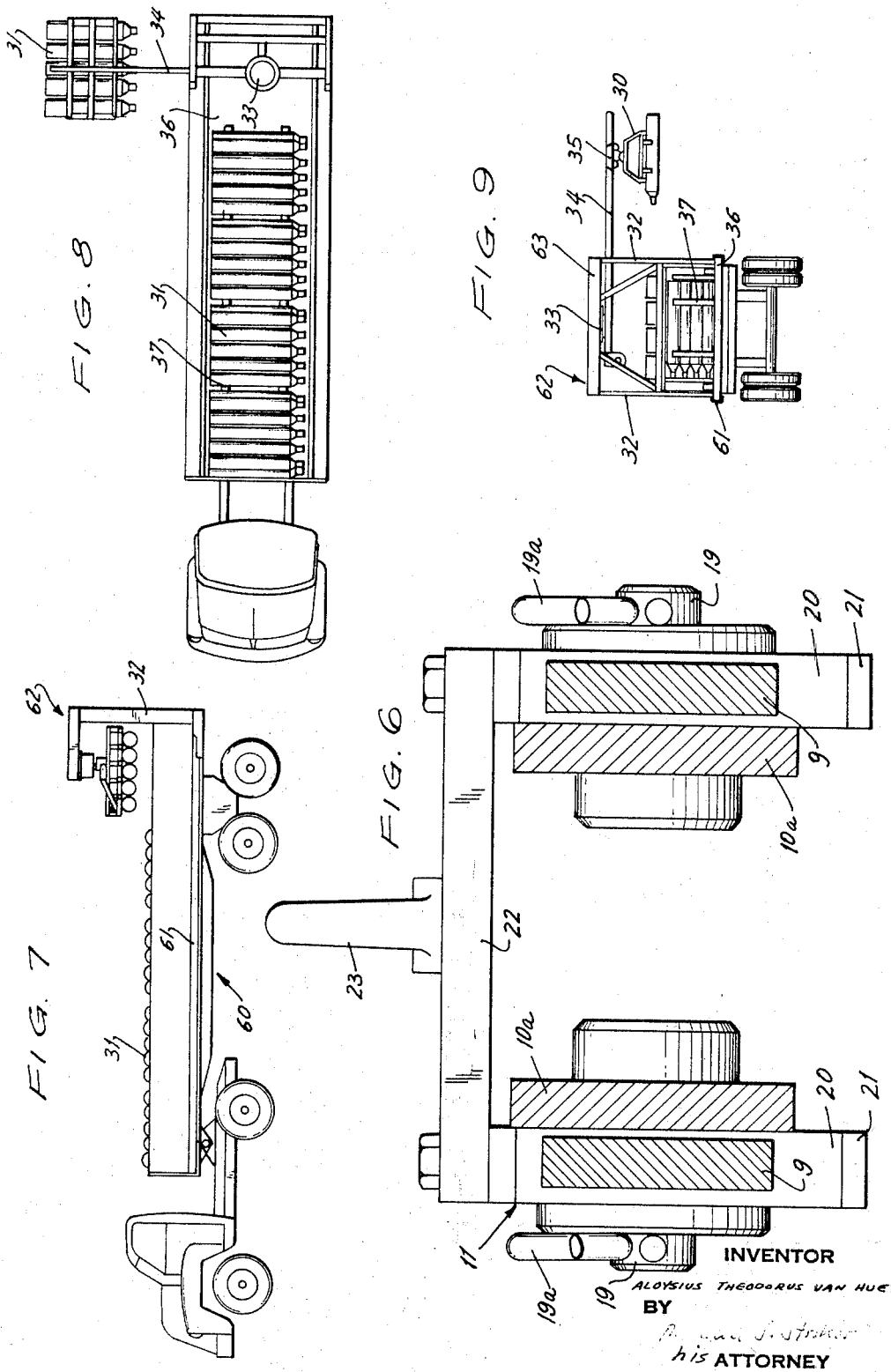

3,432,041
APPARATUS FOR TRANSFERRING
PIPES OR THE LIKE
Aloysius Theodorus van Huët, Schoolstraat 9,
Pannerden, Netherlands
Filed Dec. 29, 1966, Ser. No. 605,939
Claims priority, application Netherlands, Dec. 29, 1965,
6517076
U.S. Cl. 214—1          10 Claims
Int. Cl. B66c 17/00, 1/46

ABSTRACT OF THE DISCLOSURE

Apparatus for transferring arrays of pipes or other elongated commodities by gripping devices each of which comprises one or more fixed and one or more movable gripping members. The gripping members are mounted on a frame which can be raised and lowered by a crane. Raising of the frame causes the movable gripping members to engage the commodities which are placed or located between the fixed and movable gripping members in the lowered position of the frame.

The movable gripping members release the commodities when the frame deposits the commodities onto a supporting surface, and the apparatus is provided with means to prevent movement of movable gripping members to the gripping positions when the frame is lifted again so that the commodities need not share such renewed upward movement of the frame.

Background of the invention

The present invention relates to apparatus for transporting pipes (such as flanged or flangeless pipes made of clay), beams, timbers, steel bottles, missiles or other preferably elongated bodies of cylindrical, polygonal or other cross-sectional outline, particularly for simultaneous transfer of groups of properly arrayed heavy and bulky commodities.

It is already known to utilize power-operated apparatus for simultaneous transfer of bundled timbers which are used in mines. The apparatus comprises jaws which grab a heap of timbers and transfer them to a desired location. It is also known to utilize lifting devices in connection with individual rolls of paper or with barrels. However, all such conventional apparatus share the drawback that they cannot transfer two or more commodities without changing the relative positions of such commodities, i.e., they cannot transfer a group of properly arrayed commodities from a first location to a second location without changing the spacing therebetween.

Accordingly, it is an important object of the present invention to provide an apparatus which is capable of individually clamping and transferring two or more bulky, heavy and hard-to-handle commodities in a single operation and in such a way that the position of each commodity with reference to the other commodity or commodities remains unchanged.

Another object of the invention is to provide an apparatus of the just outlined characteristics which may be utilized for simultaneous transfer of bulky commodities from a first station at a given level to a second station at the same level or at another level, for simultaneous transfer of commodities in straight and/or arcuate paths, and for simultaneous deposition of the thus transferred commodities in the same relative positions in which the commodities were located at the first station whereby the commodities can but need not abut or otherwise contact each other.

A further object of the invention is to provide an apparatus which can be used for transfer of brittle commodities and which can derive motion from a conventional crane or a similar power-operated hoisting or lifting device.

An additional object of the instant invention is to provide the apparatus with simple gripping or clamping devices and with means for actuating such gripping devices in automatic response to lifting or lowering of the entire apparatus.

Summary of the invention

The apparatus of my invention is utilized for transfer of pipes, bottles, timbers, missiles, beams or other types of preferably elongated articles or workpieces of cylindrical, polygonal or other cross-sectional outline from a first station to a second station or vice versa. The apparatus comprises a supporting frame, a plurality of gripping devices each including a first and a second gripping member carried by and extending downwardly from the frame, at least one of the gripping members being movable with reference to the other gripping member between a first and a second position in which an article located between such gripping members is respectively clamped and released by the corresponding gripping device, hoisting means which may include a suitable crane or the like and serves to simultaneously lift and lower the gripping devices by lifting and lowering the supporting frame, and motion transmitting means for moving the one gripping member of each gripping device to first position in response to lifting of the supporting frame.

The motion transmitting means preferably comprises a train of links, levers, arms, shafts or like mechanical members arranged to pivot the one gripping member of each gripping device with reference to the other gripping member.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

Brief description of the drawing

FIG. 1 is a longitudinal vertical section through an apparatus which embodies my invention, the apparatus being shown on top of a row of pipes which are about to be transferred to another destination and the section being taken in the direction of arrows from the line I—I of FIG. 2;

FIG. 2 is a top plan view of the apparatus;

FIG. 3 is an end elevational view as seen from the left-hand side of FIG. 1 or 2;

FIG. 4 is an enlarged side elevational view of a detail of the structure shown in FIG. 1;

FIG. 5 is a horizontal section as seen in the direction of arrows from the line V—V of FIG. 4;

FIG. 6 is an enlarged transverse vertical section as seen in the direction of arrows from the line VI—VI of FIG. 4;

FIG. 7 is a side elevational view of a tractor and trailer combination wherein the trailer carries a crane supporting the apparatus of FIGS. 1 to 3;

FIG. 8 is a top plan view of the structure shown in FIG. 7; and

FIG. 9 is a rear elevational view as seen from the right-hand side of FIG. 7 or 8.

Description of the preferred embodiments

Referring first to FIGS. 1 to 3, there is shown an apparatus which can be utilized for transfer of pipes 50 or other elongated articles of cylindrical, polygonal or other cross-sectional outline between a first station and a second or receiving station. The apparatus comprises a substantially rectangular supporting frame 1 for a set of five gripping devices each of which includes at least one first gripping member or finger 2 which is fixedly secured to and extends downwardly from the frame 1 and at least one second or movable gripping member or finger 3 which is fixed to a horizontal pivot 4 rotatably carried by the frame 1. The pivots 4 are parallel to and equidistant from each other. Each finger 3 is movable with reference to the corresponding finger 2 between a first or operative position (shown in FIG. 1) in which the respective gripping device engages and clamps a pipe 50 and a second or inoperative position in which the pipe is released. It will be seen that the fingers 2, 3 are arched and that their lower ends extend below the horizontal symmetry planes of the respective pipes 50 so that each such pipe is securely gripped when the fingers 3 are caused to assume their operative positions.

The apparatus further comprises hoisting or lifting means for moving the frame 1 with the five gripping devices up and down, and such hoisting means comprises a pulley 5 which is mounted at the free upper end of a lever 6 forming part of a motion transmitting assembly adapted to move the fingers 3 with reference to the fingers 2 in response to lifting and lowering of the frame 1 and in such a way that the fingers 3 are moved to their operative positions in response to lifting of the frame and that the fingers 3 move or can be moved to inoperative positions when the frame is lowered. A suitable cable or rope (not shown) which is trained around the pulley 5 will lift or lower the frame 1 with the five gripping devices in response to operation of a winch or another power-driven device which forms part of a crane employed to effect transfer of pipes 50 between the first and second stations.

The aforementioned motion transmitting assembly further comprises a shaft 8 which is rockably mounted on and extends transversely of the frame 1 in parallelism with the pivots 4. This shaft is rocked back and forth in response to motion transmitted thereto by the lever 6. Two forks 7 are rigid with the shaft 8 and are provided with pivots 9a for two links 9. These links are disposed at the opposite sides of and are detachably connected with a reciprocable shifting unit 10 by means of a lock 11 which will be described in connection with FIGS. 4 to 6. The shifting unit 10 comprises a horizontal guide member in the form of a hollow beam 10a which is detachably coupled to the links 9 by the lock 11 and can receive from these links motion to travel back and forth transversely of the pivots 4 in response to rocking of the shaft 8 by the lever 6 and pulley 5. It is to be noted that the pulley 5 may be replaced by a hook or the like. The shifting unit 10 forms part of the aforementioned motion transmitting assembly and can rock five upwardly extending arms 12 each of which is rigidly attached to one of the pivots 4, i.e., to one of the movable fingers 3. The guide member or beam 10a accommodates five reciprocable coupling members 13 each of which is articulately connected with the upper end of an arm 12. The beam 10a is further provided with five stops or partitions 15 which share its reciprocatory movements and cooperate with the coupling members 13 to confine five prestressed helical springs 16 which tend to urge the corresponding movable fingers 3 to operative positions. The bias of each spring 16 may be regulated by an adjusting rod 14 carrying an adjusting nut 17. Each rod 14 is affixed to the respective coupling member 13 but is slidable in the adjoining partition or stop 15. The purpose of the springs 16 is to compensate for differences in diameters of articles 50 which are being transferred in a simultaneous operation. The arrangement is such that the springs 16 can bias the fingers 3 into engagement with the pipes 50 even if they happen to break; in such instance, the bias of a damaged spring 16 decreases but does not disappear.

The frame 1 carries an adjustable locating member 24 which can be moved into abutment with the end face of at least one pipe 50 to insure that the gripping devices engage predetermined portions of the pipes, see FIG. 3.

This illustration shows that each pivot 4 can carry two pairs of axially spaced gripping fingers 2, 3, i.e., that each gripping device may comprise one or more fixed fingers 2 and preferably an equal number of movable fingers 3. The number of and the axial distance between such fingers will depend on the overall length of treated articles and on the weight of such articles.

An abutment 25 (shown in FIG. 3) serves to limit the rocking movements of the shaft 8 and lever 6 and hence the reciprocatory movements of the shifting unit 10. In the illustrated embodiment, the abutment 25 resembles a yoke which extends across the path of the lever 6 (see also FIG. 1).

The operation is as follows:

The articles to be transferred from a first or loading station to a second station (for example, onto the platform of a truck or trailer) are stacked at the first station which is shown in FIG. 1 at a level below the frame 1. The first station may be provided with spacers or patterns 51 which are inserted between the lower row of pipes 50a (indicated by broken lines). The next row of pipes 50 is then placed onto the pipes 50a whereby the pipes 50 automatically assume requisite positions with reference to each other to provide between themselves gaps 52 wide enough for entry of fingers 2 and 3. The stack of array of pipes at the first station may comprise a single row or two or more superimposed rows of pipes.

The hoisting means is then caused to lower the frame 1 onto the upper row of pipes 50 in such a way that a finger 2 of a first gripping device and a finger 3 of the adjoining gripping device finds its way through a gap 52. The fingers 3 can yield against the opposition of the springs 16. The locating member 24 can be used to properly locate the frame 1 intermediate the longitudinal ends of the pipes 50 of the upper row. When the motion transmitting assembly is inactive, the right-hand end of the lever 6 assumes the broken-line position 6' shown in FIG. 1. The hoisting means is then operated to lift the pulley 5 and to entrain the frame 1 together with the five gripping devices. During the first stage of upward movement of the pulley 5 (to the solid line position of FIG. 1), the frame 1 continues to rest on the pipes 50 but the pulley rocks the lever 6 which in turn rocks the shaft 8 in a counterclockwise direction to move the forks 7 from the broken-line positions 7' to the solid-line positions of FIG. 1. This causes the links 9 to move in a direction to the left, as viewed in FIG. 1, and to entrain the lock 11 together with the guide member or beam 10a of the shifting unit 10. The stops 15 push the springs 16 in a direction to the left and such springs transmit motion to the coupling members 13 which rock the arms 12, pivots 4 and fingers 3 in a counterclockwise direction, as viewed in FIG. 1, whereby the fingers 3 cooperate with the fixed fingers 2 to safely grip the upper row of five pipes 50. The pulley 5 continues to rise and lifts the entire frame 1, together with the gripping devices and pipes 50. The thus lifted frame is then transported laterally (either in a straight path or in an arcuate path) and, when located above the receiving station, moves downwardly to deposit the five pipes 50 onto a platform or another supporting body. As stated before, the springs 16 compensate for eventual differences between diameters of the pipes 50 and their bias suffices to prevent unintentional release of a pipe 50 until and unless the pipes are placed onto a stationary supporting surface.

When the pipes are deposited on a platform, the apparatus must be disengaged therefrom, i.e., the frame 1 must be lifted above the pipes 50 without permitting the fingers 3 to return to operative positions. This can be accomplished by suitable manipulation of the lock 11 which is shown in FIGS. 4 to 6. The lock comprises two horizontal follower pins 19 which extend laterally from the beam 10a and are affixed thereto. Each of these follower pins 19 normally extends into a vertical portion of an L-shaped slot 20 machined into a plate 21 provided at the righthand end of the adjoining link 9. Cotter pins 10a prevent movement of plates 21 axially and away from the follower pins 19. When the pins 19 extend into the vertical portions of the respective slots 20, all movements of the links 9 are transmitted to the beam 10a which in turn causes the arms 12 to turn the pivots 4. However, if the follower pins 19 are caused to enter the horizontal portions of the respective slots 20, the links 9 can rock independently of the beam 10a and the latter remains in its position so that the frame 1 can be lifted with the gripping devices without causing an upward movement of the pipes 50. The means for moving the plates 21 with reference to the follower pins 19 comprises an eye 23 which is affixed to a crosshead 22 connecting the two plates 21 to each other. The eye 23 is connected to one end of a Bowden wire or the like and, when lifted (either by hand or by means of a motor), the plates 21 move upwardly (as viewed in FIG. 4) and cause the follower pins 19 to enter the left-hand ends of the horizontal portions of the respective L-shaped slots 20. When the lifting force upon the eye 23 and crosshead 22 is relaxed or terminated, the links 9 descend by gravity and return their plates 21 to the positions shown in FIG. 4 whereby the beam 10a is again coupled to the links 9 and reciprocates in response to rocking of the lever 6 to the pulley 5. It is clear that the links 9 can be rocked relative to the beam 10a by other suitable means, for example, by hand, by electromagnets or the like. Furthermore, the follower pins 19 will enter the horizontal portions of the respective slots 20 if the eye 23 is replaced by a device which can rock the shaft 8 together with the links 9. The weight of the links 9 suffices to insure that the follower pins 19 normally assume the positions shown in FIG. 4, i.e., in the upper ends of the vertical portions of the slots 20.

All bearings of the apparatus are preferably of the self-lubricating type or are sealed to prevent escape of lubricant.

FIGS. 7 to 9 illustrate one mode of utilizing the improved apparatus on a tractor and trailer combination. The platform 36 of the semitrailer 60 is provided with tracks 61 for the side frames 32 of a travelling gantry crane 62. The crosshead 63 of the crane 62 carries a bearing 33 for a boom 34 which supports a slidable carriage 35 for a winch whose cable is trained around the pulley 5 of the transfer apparatus, the latter being designated by the numeral 30. The receiving station is defined by the platform 36 of the semitrailer 60. This platform supports racks 37 for the articles 31 here shown as steel bottles for acetylene gas or the like. The apparatus 30 can lift five bottles 31 at a time from a first station which is adjacent to the semitrailer 60 and, once the apparatus 30 is lifted to the level shown in FIG. 9, the carriage 35 is caused to travel into the space between the side frames 32 so that the apparatus can be lowered toward the platform 36 in order to deposit five bottles 31 on the corresponding rack 37. The operation is repeated as often as necessary and the crane 62 is moved lengthwise of the platform 36 so that the latter is loaded uniformly from end to end.

Evacuation of bottles 31 takes place by reversing the just described sequence of steps whereby the gripping members 3 are prevented from reengaging the bottles 31 when the array of bottles carried by the five gripping devices reaches its destination. The bearing 33 is preferably provided with suitable locking means to prevent uncontrolled swiveling of the boom 34.

It is clear that the number of gripping devices on the frame 1 can be increased or reduced and that all of the gripping fingers 3 need not pivot about parallel axes.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:
1. Apparatus for transferring pipes or other elongated articles comprising a plurality of gripping devices connected to each other but spaced from each other in one direction and each including a first and a second gripping member, at least one of said gripping members being movable with respect to the other member between a first and a second position in which an article located between such members is respectively clamped and released by the corresponding gripping device; hoisting means for simultaneously lifting or lowering said gripping devices; and motion transmitting means for moving said one gripping member of each gripping device to said first position in response to lifting of said gripping devices, said motion transmitting means comprising a shifting unit including an elongated guide extending in said direction, means for reciprocating said guide in longitudinal direction in response to lifting and lowering said gripping devices, a plurality of coupling members slidable along said guide and each operatively connected to a respective one of said movable gripping members, a plurality of stops rigid with said guide, and biasing means interposed between each of said coupling members and one of said stops to urge each of said coupling members to a position corresponding to the first position of the respective movable gripping member.

2. Apparatus as defined in claim 1, and further comprising a supporting frame for said gripping devices, said other gripping member of each gripping device being fixed on said frame and said one gripping member of each gripping device comprises a pivot which is rotatable in said frame, said pivots being parallel to each other, and said motion transmitting means further comprising an arm fixed to each of said pivots and said shifting unit being coupled to said arms and reciprocable transversely to said pivots.

3. Apparatus as defined in claim 1, further comprising adjusting means for regulating the bias of said biasing means.

4. Apparatus as defined in claim 2, wherein the means for reciprocating said shifting unit comprises a shaft rockably supported by said frame, means for rocking said shaft back and forth in response to lifting and lowering of said frame, and means for reciprocating said shifting unit in response to rocking of said shaft.

5. Apparatus for transferring pipes or other elongated articles comprising a supporting frame; a plurality of gripping devices each including a first gripping member fixed to said frame and a second gripping member having a pivot turnably mounted in said frame so as to be movable with reference to said first gripping member between a first and a second position in which an article located between such members is respectively clamped and released by the corresponding gripping device; hoisting means for lifting and lowering said frame; and motion transmitting means for moving said second gripping member of each gripping device to said first position in response to lifting said frame, said motion transmitting means comprising a shifting unit operatively connected to said movable gripping members and reciprocable transversely to said pivots and including a follower, and means for reciprocating said shifting unit comprising a shaft rockably supported by said frame, means for rocking said shaft back and forth in response to lifting and lowering said frame, and said means for reciprocating said shifting unit in response to rocking of said shaft including a link fixed to said shaft and provided with a slot having a substantially vertical portion and a substantially horizontal portion, said shifting unit being reciprocated in response to rocking of said shaft when said follower extends into the vertical portion of said slot.

6. Apparatus as defined in claim 5, further comprising means for moving said follower into the horizontal portion of said slot so that said link can be rocked by said shaft independently of said shifting unit.

7. Apparatus as defined in claim 5, wherein the means for rocking said shaft comprises a lever fixed to said shaft and a power-driven device for rocking said lever.

8. Apparatus as defined in claim 7, wherein said power-driven device comprises a pulley rotatably mounted on said lever.

9. Apparatus as defined in claim 5, further comprising means for limiting rocking movements of said shaft.

10. Apparatus as defined in claim 1, wherein said hoisting means comprises a travelling crane arranged to transfer said gripping devices from a first station to a second station or vice versa.

References Cited
UNITED STATES PATENTS

| | | | |
|---|---|---|---|
| 2,902,311 | 9/1959 | Reel | 294—87 |
| 3,081,124 | 3/1963 | Kaplan | 294—87 |

GERALD M. FORLENZA, *Primary Examiner.*

GEORGE F. ABRAHAM, *Assistant Examiner.*

U.S. Cl. X.R.

214—87